United States Patent [19]

Kubota et al.

[11] Patent Number: 5,052,747
[45] Date of Patent: Oct. 1, 1991

[54] FLEXIBLE TOP APPARATUS OF A VEHICLE

[75] Inventors: Satoshi Kubota; Takahito Yokouchi, both of Hiroshima, Japan

[73] Assignee: Mazda Motor Corporation, Hiroshima, Japan

[21] Appl. No.: 676,464

[22] Filed: Mar. 26, 1991

Related U.S. Application Data

[63] Continuation of Ser. No. 385,730, Jul. 27, 1989, abandoned.

[30] Foreign Application Priority Data

Jul. 30, 1988 [JP] Japan .................. 63-191662

[51] Int. Cl.⁵ .................. B60J 7/06; B60J 7/12
[52] U.S. Cl. .................. 296/219; 296/107
[58] Field of Search .................. 296/219, 107

[56] References Cited

U.S. PATENT DOCUMENTS

| | | | |
|---|---|---|---|
| 1,860,463 | 5/1932 | Kaplan et al. | 296/219 |
| 2,694,598 | 11/1954 | Ulrich | 296/107 |
| 4,830,428 | 5/1989 | Masuda et al. | 296/219 |

FOREIGN PATENT DOCUMENTS

| | | | |
|---|---|---|---|
| 26118 | 2/1987 | Japan | 296/107 |
| 31516 | 2/1987 | Japan | 296/107 |
| 61629 | 3/1988 | Japan | 296/219 |
| 162326 | 7/1988 | Japan | 296/219 |

Primary Examiner—Dennis H. Pedder
Attorney, Agent, or Firm—Fish & Richardson

[57] ABSTRACT

In a roof panel connected to a vehicle body through at least a pair of left-hand and right-hand front pillars and a pair of left-hand and right-hand rear pillars, there is formed a roof opening (3) large in size in such a manner as leaving a front header, a pair of left-hand and right-hand roof side rails, and a rear header and being surrounded by said four members. A foldable or windable flexible top having a size as substantially large as the roof opening is provided. The flexible top is disposed to selectively take a first posture in which the roof opening is closed and a second posture in which it is contracted in a longitudinal direction of the body and placed in a contracted state, i.e., in a folded or wound state, at a position nearby said rear header. The flexible top in such a contracted state is guided by a guiding means and transferred between the second posture and a third posture located nearby a lower end portion of the rear window glass panel in a spaced relationship away from and without contact with the rear window glass panel and the rear pillars.

11 Claims, 10 Drawing Sheets

FLEXIBLE TOP APPARATUS OF A VEHICLE

This application is a continuation of U.S. application Ser. No. 07/385,730, filed July 27, 1989, now abandoned.

BACKGROUND OF THE INVENTION

1. Field of the Invention

The present invention relates to a flexible top apparatus of a vehicle, as an automobile.

2. Description of Related Art

There is an automobile in which an upper portion of the vehicle chamber is open to thereby enjoy open air.

The automobile of the open air type requires a member for covering its vehicle chamber to be used when required or needed as when it rains. As such a member may be used a foldable or windable flexible-sheet, or a top.

Representative of such an automobile is one of full open type, which may be called a Cabriole type. An automobile of full open type as disclosed in U.S. Pat. No. 4,572,570 is basically of a type designed to allow an upper portion and a rearward upper portion of its vehicle chamber are fully open. More specifically, the automobile is provided with a front window glass panel, but no rear pillar is provided which is otherwise required in order to support the roof panel and a rearward end portion of the roof panel. Although the automobile of the full open type presents the advantage that its vehicle chamber can be widely open, it poses various difficulties at the same time that a rigidity of the vehicle body is hardly ensured because neither roof panel nor rear pillar are mounted, that the flexible top should be constructed in such a shape as covering the rearward upper portion of the vehicle chamber as well as the upper portion thereof when it is brought into a closed state, thus complicating its structure, and that a sealing performance of the flexible top is poor when it closes the vehicle chamber.

There is accordingly the increasing tendency that an automobile of a flexible top type which may be called of a canvas top type (see U. K. Patent Specification No. 1,315,364). The automobile of flexible top type or canvas top type is such that only an opening formed on a roof panel—such an opening being referred to herein as "roof opening"—is covered (closed) or uncovered (opened) with a flexible sheet so that this type may called a flexible top or a so-called flexible roof. The automobile of this flexible top type is provided with a roof panel having a wide opening, or roof panel opening, connected to the vehicle body at least through front and rear pillars in such a manner that the roof panel opening is closed or opened with the flexible top. More specifically, the roof panel is of the type such that its whole middle portion is wide open as a roof panel opening except its front header, a pair of its left-hand and right-hand side rails, and its rear header. In other words, the front and rear headers and the side rails constitute a four-sided circumference of the roof panel opening and a front window glass panel is fixed with a pair of the left-hand and right-hand front pillars and the front header while a rear window glass panel is fixed with a pair of the left-hand and right-hand rear pillars and the rear header.

As the flexible top is in a closed state in which it fully closes the roof panel opening, the flexible top is designed such that its forward end is brought into abutment with the front header of the roof panel, its left-hand and right-hand side end portions are in abutment with the left-hand and right-hand roof side rails, and its rearward end is abutted with the rear header. This arrangement ensures a rigidity of the vehicle body to a sufficient extent because a framework of an upper circumference of the vehicle chamber is constituted by the left-hand and right-hand front pillars, front header, left-hand and right-hand roof side rails as well as rear header, such members being connected to each other. This structure further provides the advantage that it is simple because the flexible top is designed simply to open or close the roof panel opening. Furthermore, it presents the advantage that most common automobiles with a roof panel supported with front and rear pillars can be converted to those of flexible top type by small modifications. For the above reasons, recently, there is the tendency that automobiles of flexible top type increase dramatically.

The automobile of the flexible top type is designed so as to take a closed posture, or to become in a closed state, in which the roof panel opening is closed by fixing a rearward end portion of the flexible top to the rear header while abutting a forward end portion of the top with the front header, on the one hand, and so as to take an open posture, or to become in an open state, in which the roof panel opening is wide open by transferring the forward end portion of the top rearwardly to a large extent from the closed posture toward the rear header. At this open posture, the flexible top is housed or accommodated in a folded or wound state.

For the automobiles of conventionally flexible top type, however, the flexible top in a housed state is still extended wide in a longitudinal direction so that it covers over a considerably large portion of the roof panel opening, thus impairing a sufficiently open feeling. It is further to be noted that, as the roof panel opening is open while the flexible top is housed, the flexible top is in a state that it projects upwardly to a considerable extent, thus resisting air during running so that it increases a resistance to air and it causes running noises derived from wind-blowing.

Proposals have been further made of an automobile positioned in between the flexible top (canvas top) type and the full open type. Japanese Patent Publication (Kokai) 162,326/1988 proposes the type in which a rearward opening surrounded by the rear header and a pair of the left-hand and right-hand rear pillars is opened or closed, too, by a top composed of a flexible sheet, in addition to the roof opening surrounded by the front header, a pair of left-hand and right-hand roof side rails, and the rear header. For this type of the automobile, the flexible top is accommodated at a position nearby or close to a lower end portion of the rearward opening so that this type is advantageous in terms of an open feeling and a resistance to air. However, it is considerably difficult to ensure a complete sealing for closing the roof opening and the rearward opening because the flexible top should close the both openings and because a plane containing the roof opening is connected to a plane containing the rearward opening at a relatively sharp angle. Furthermore, the flexible top should be considerably large enough to cover the both openings and the structure for accommodating such a large flexible top should also be rendered complicated. On top of that, the flexible top should be provided with the function which serves as a rear window glass, too.

SUMMARY OF THE INVENTION

Therefore, the present invention has the object to provide a flexible top apparatus of a vehicle, as automobile, capable of opening an upper portion of its vehicle chamber and housing a flexible top so as to cause no resistance to air during running, assuming that only the roof opening formed in the roof panel is opened or closed by means of the flexible top.

In order to achieve the object, the present invention consists of a flexible top apparatus of a vehicle, comprising:

a roof panel connected to a vehicle body through at least a pair of left-hand and right-hand front pillars and a pair of left-hand and right-hand rear pillars;

a roof opening formed in said roof panel leaving a front header, a pair of left-hand and right-hand roof side rails, and a rear header and surrounded by said front header, said left-hand and right-hand roof side rails, and said rear header;

a rear window glass panel fixed to said rear pillars and said rear header;

a flexible top having a size as substantially large as the roof opening in a state in which said flexible top is unfolded and expanded in a longitudinal direction of the vehicle body and being disposed to selectively take a first posture in which the roof opening is closed and a second posture in which said flexible top is contracted in a longitudinal direction of the vehicle body and placed at a position nearby said rear header to open the roof opening; and a guide means disposed between said flexible top and the vehicle body for guiding said flexible top in a contracted state between said second posture and a third posture which is located in a vicinity of a lower end portion of said rear window glass panel at a spaced relationship away from said rear window glass panel, rear header, and rear pillars.

In accordance with the present invention, the flexible top apparatus as having the structure as have been briefly described hereinabove is such that the flexible top is accommodated at a position rearward of a rear window glass panel and nearby or in a vicinity of a lower end portion of the rear window glass panel so that the roof opening is not closed at all by the flexible top when accommodated and, at the same time, the flexible top in an accommodated state does not resist the air during running.

Further, the flexible top is disposed so as to become in a spaced relationship away from the vehicle body in a region between a second position nearby or in a vicinity of the rear header and a third position nearby or in a vicinity of the lower end portion of the rear window glass panel when the flexible top is transferred, thereby preventing the flexible top from interfering with the vehicle body and rubbing the body while the flexible top is being moved. Accordingly, even if the rear window glass panel has a large curvature, the flexible top does not rub the rear window glass panel and it can climb over the rear header. Furthermore, the flexible top can avoid an interference with the rear header so that it does not require the rear header to be disposed inward the vehicle chamber and a clearance for heads of passengers seated on the rear sheets to be lowered.

Other objects, advantages and features of the present invention will become apparent in the course of the description of the preferred embodiments which follows with reference to the accompanying drawings.

DESCRIPTION OF THE PREFERRED EMBODIMENTS

The present invention will be described more in detail by way of examples.

Figure 1:
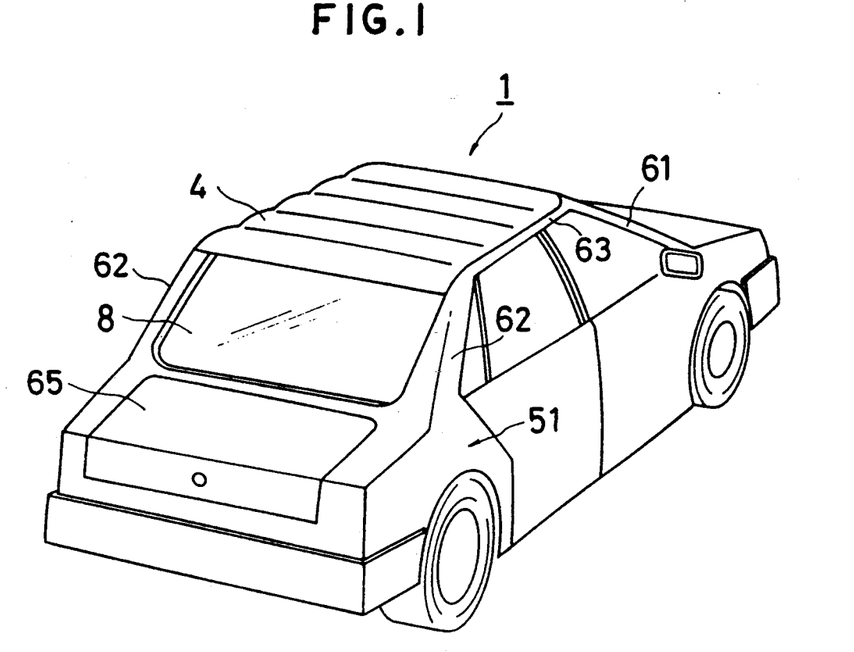
FIG. 1 is a perspective view showing an outline of a flexible top automobile according to an example of the Present invention in a state that the roof opening is closed.
Figure 2:
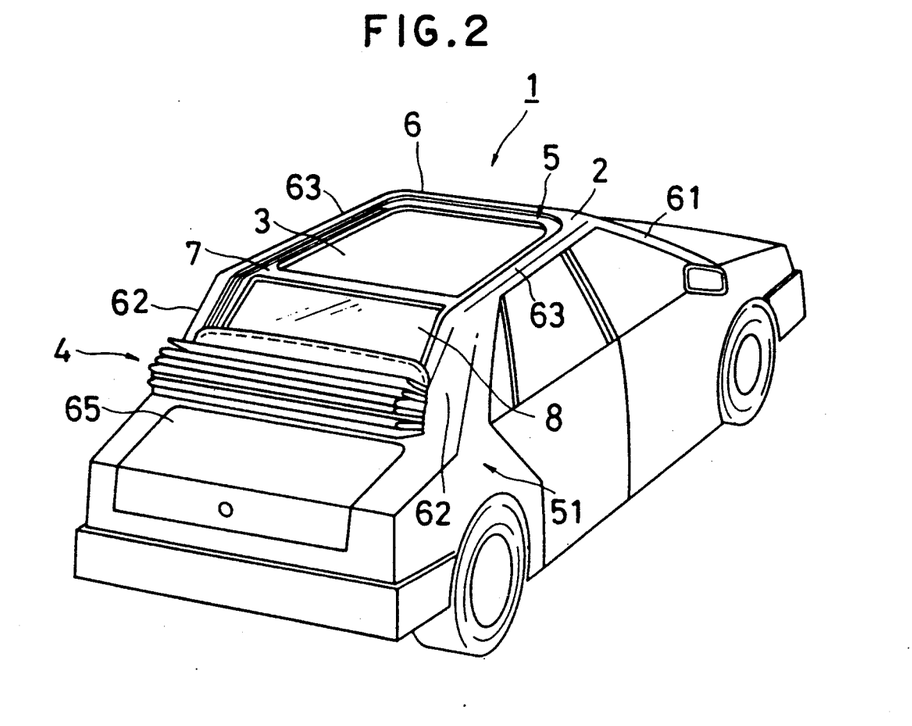
FIG. 2 is a perspective view showing an outline of the flexible top automobile according to an example of the present invention in a state that the roof opening is open.

As shown in FIGS. 1 and 2, reference numeral 1 denotes an automobile of a canvas top type, and a rectangular roof opening 3 of the canvas top type automobile 1 is formed in a roof panel 2 and the roof opening 3 is opened or closed by means of a flexible top 4.

Figure 3:
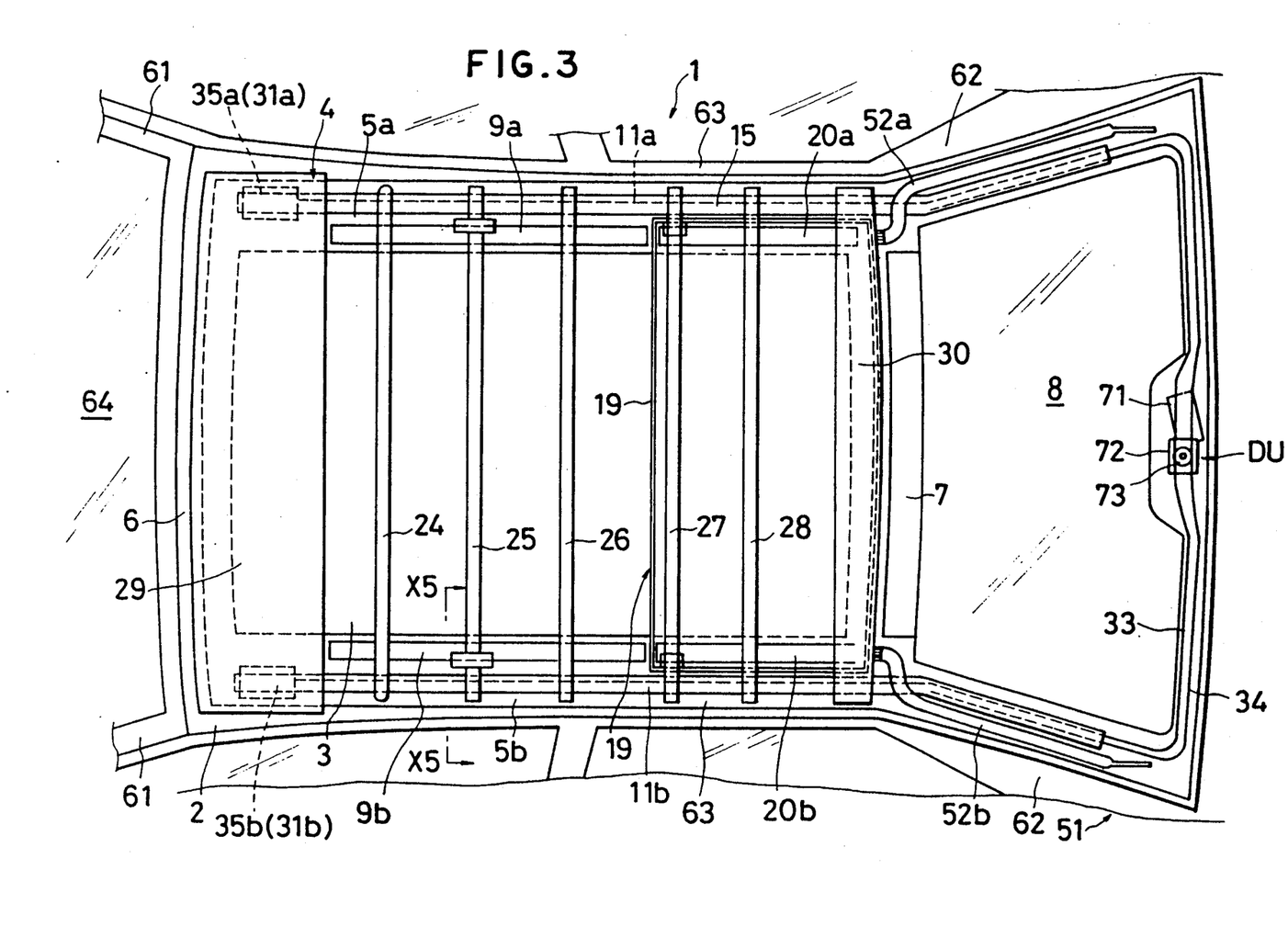
FIG. 3 is a plan view showing a flexible top automobile according to an example of the present invention.

Referring to FIG. 3, the roof panel 2 is connected to a vehicle body 51 (a lower portion of the vehicle body) through at least a pair of left-hand and right-hand front pillars 61 and a pair of eft-hand and right-hand rear pillars 62. The roof opening 3 is formed leaving a front header 6, a pair of left-hand and right-hand roof side rails 63, and a rear header 7 from the roof panel 2 so as to provide a large opening area surrounded by these four elements. To the front header 6 and the left-hand and right-hand front pillars is fixed a front window glass panel 64 (FIG. 3). To the rear header 7 and the left-hand and right-hand rear pillars 61 is fixed a rear window glass panel 8.

The roof panel 2 is provided with a flange portion 5 on a circumferential side portion of the opening 3 as shown in FIGS. 2 and 3. Among the flange portions, the flange portions 5a and 5b disposed on the both sides in the transverse direction of the vehicle body extend from the front header 6 over the rear header 7 toward the rear window glass panel 8. On the side of the rear window glass panel 8, the flange portions 5a and 5b expand outward in the transverse direction as they extend downward along the circumferential side edge portions of the rear window glass panel 8.

The flange portions 5a and 5b are mounted with guide rails 9a and 9b, respectively, as shown in FIG. 3.

Figure 5:
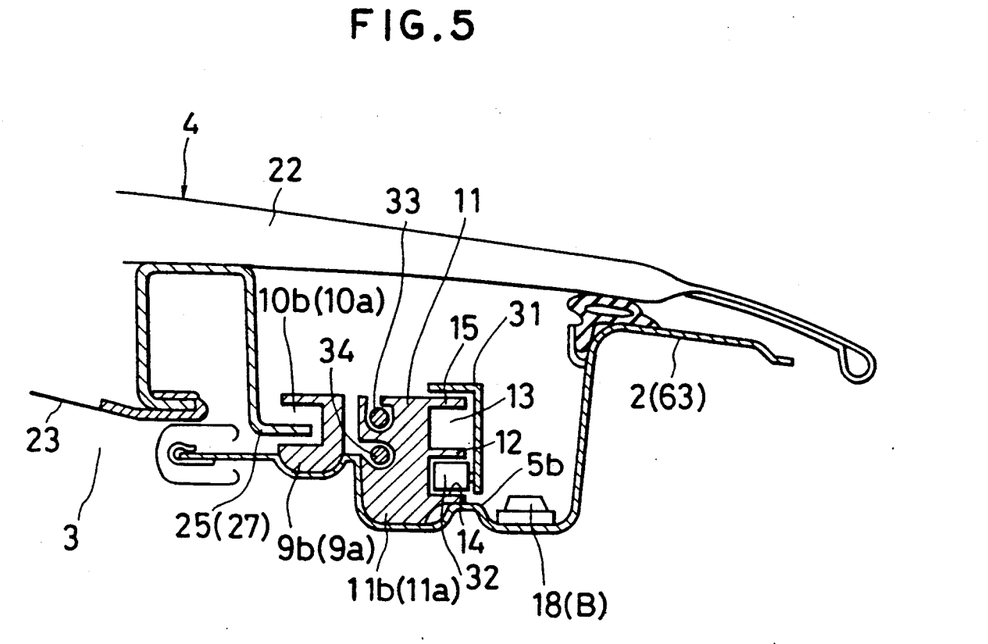
FIG. 5 is an enlarged section view taken along the line X5—X5 of FIG. 3.

The guide rails 9a and 9b extend in parallel to each other from the forward end portion of the opening 3 until halfway to a rearward end thereof, and they are provided with guide grooves 10a and 10b, respectively, opening inward in the transverse direction of the vehicle body as shown in FIG. 5.

Figure 4:
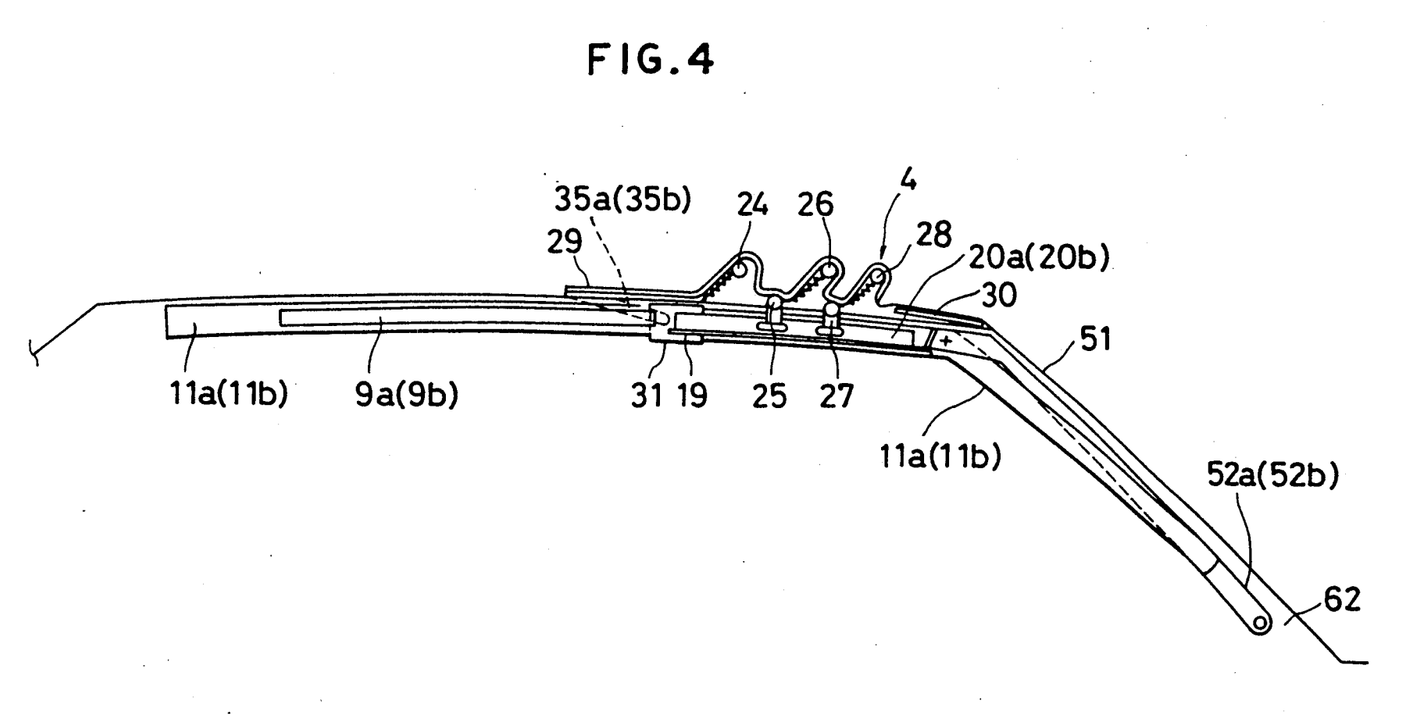
FIG. 4 is a schematic vertical section of FIG. 3.
Figure 6:
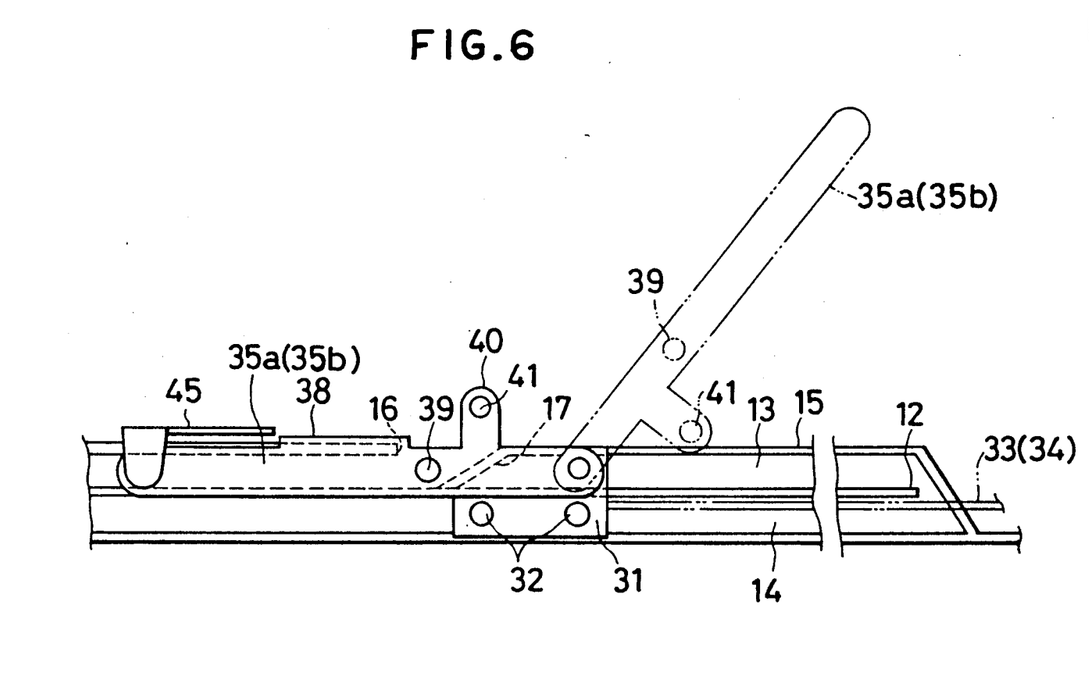
FIG. 6 is a front view showing the relationship of the guide rails with the link members.

Furthermore, as shown in FIG. 3, the flange portions 5a and 5b are mounted with guide rails 11a and 11b disposed outward of the guide rails 9a and 9b in the transverse direction of the body. As shown in FIGS. 3 and 4, the guide rails 11a and 11b are disposed extending from the forward end of the opening 3 across the rear header 7 toward a lower position of the rear window glass panel 8. On the side of the rear window glass 8 rearward of the rear header 7 are disposed the guide rails 11a and 11b so as to part from each other farther away at substantially the same angles as they extend downward along the side circumferential portions of the rear window glass panel 8. As shown in FIG. 6, each of the guide rails 11a and 11b is provided over its full length with a guide groove which is divided by a partition portion 12 into an upper guide groove 13 and a lower guide groove 14. Each of the upper and lower guide grooves 13 and 14 has an opening facing outward in the transverse direction of the body. On an upper wall portion 15 of each of the guide rails 11a and 11b is formed a cut-away portion 16 which, in turn, is located on the rear end side of the roof opening 3 forward of the rear header 7 in the forward direction of the vehicle body. Between the partition portion 12 and the upper wall portion 15 is mounted a guide inclination plate 17 which extends in the rearward direction of the body as it is directed upward, so as to face the cut-away portion 16.

As shown in FIG. 5, each of the flange portions 5a and 5b is mounted with a rack 18 which is located at a position approximately next to the position of the cut-away portion 16 of each of the respective guide rails 11a and 11b on the side outward in the transverse direction of the body from the guide rails 11a and 11b.

Figure 9:
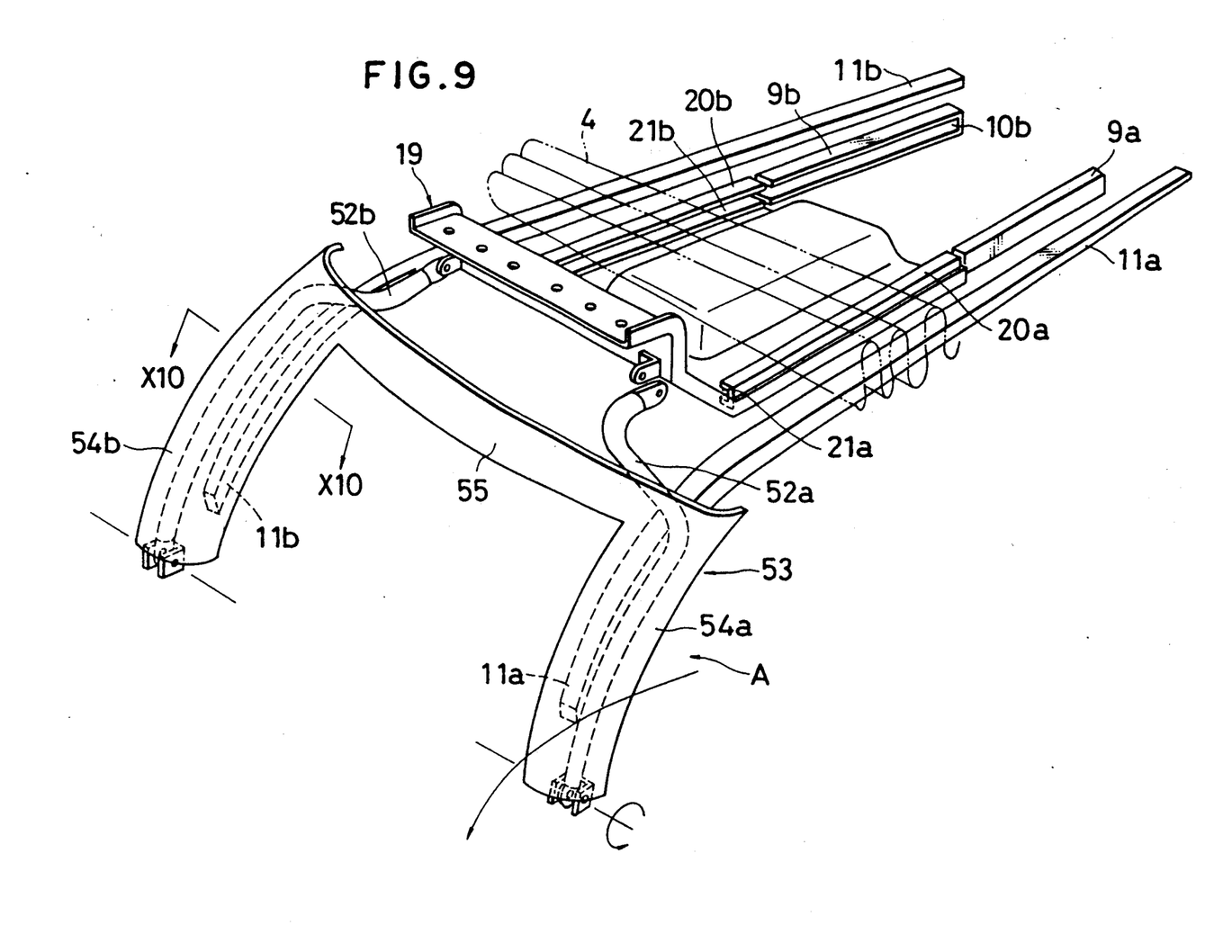
FIG. 9 is an enlarged perspective view showing the relationship of the guide rails, a pair of the link members and garnish members with the board member.

Referring back to FIG. 3, a board member 19 is mounted on the roof panel 2 so as to bridge the flange portions 5a and 5b on the inner side of the guide rails 11a and 11b. The board member 19 is disposed between the rearward ends of the guide rails 9a, 9b and the rearward end portions of the roof opening 3 and is provided thereon with a pair of guide rails 20a and 20b as shown in FIGS. 3 and 9. The guide rail 20a is disposed so as to become continuous toward the guide rail 9a while the guide rail 20b is disposed so as to become continuous toward the guide rail 9b. Guide grooves 21a and 21b formed on the respective guide rails 20a and 20b have openings facing inward in the transverse direction of the body. The board member 19 is connected to a pair of link members (second link members) 52a and 52b constituting a guide means A as will be described hereinafter and is mounted so as not to be displaceable on the roof 2.

As have been described hereinabove, the guide rails 20a (20b) and 9a (9b) are composed separately, thus constituting an inner guide rail, and the guide rail 11a (11b) constituting an outer guide rail.

Figure 8:
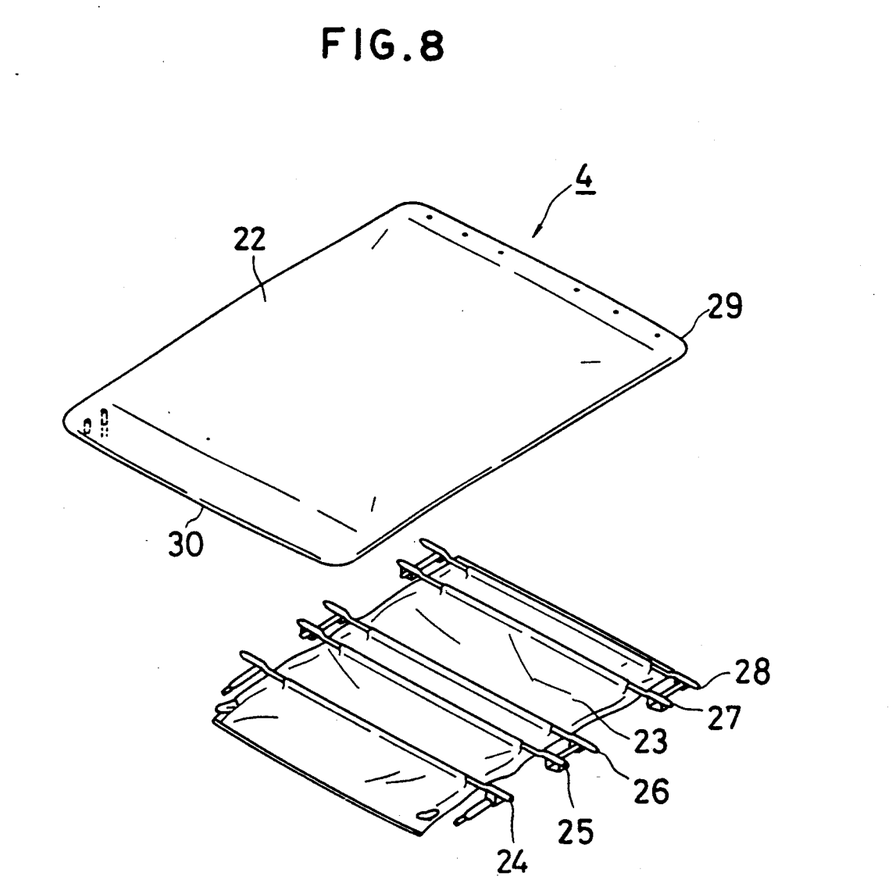
FIG. 8 is an explanation view for explaining the flexible top.

As shown in FIG. 1 and FIG. 3 (showing a skeletonal structure alone), the flexible top 4 is disposed on the roof 2 when the roof opening 3 is closed. As is known as shown in FIGS. 3 and 8, the flexible top 4 comprises a leather top 22, a sealing leather 23 mounted on the inner side of the leather top 22, plural skeletons 24 to 28 mounted on the sealing leather 23, a front hard board 29 mounted on the forward end side of the leather top 22 and a rear hard board 30 mounted on the rearward end side of the leather top 22. The leather top 22 and sealing leather 23 are not shown in FIG. 3. It is noted that they are composed of a flexible sheet.

The flexible top 4 is such that the rear hard board 30 is fixed to the rearward end portion of the board member 19 and the front hard board 29 is mounted astride over the upper surfaces of the guide rails 11a and 11b. The both end portions of the skeletons 25 and 27 of the flexible top 4 are slidably supported by the guide grooves 10a, 10b and 21a, 21b of the respective guide rails 9a, 9b and 20a, 20b, and the both end portions of the skeletons 24, 26, 28 are disposed astride over the guide rails 9a, 9b and 20a, 20b, while an upward displacement of the flexible top is regulated in each case. This arrangement enables the front hard board 29 to be displaced or transferred toward the rear of the body and the flexible top 4 to be folded or contracted in a wavy form and placed on the board member 19 (located at a second posture), thus opening the roof opening 3 in conventional manner. On the contrary, a displacement of the front hard board 29 toward the front of the body folds and expands the flexible top 4 and closes the roof opening 3 (located at a first posture) as shown in FIGS. 1 and 3.

Figure 7:
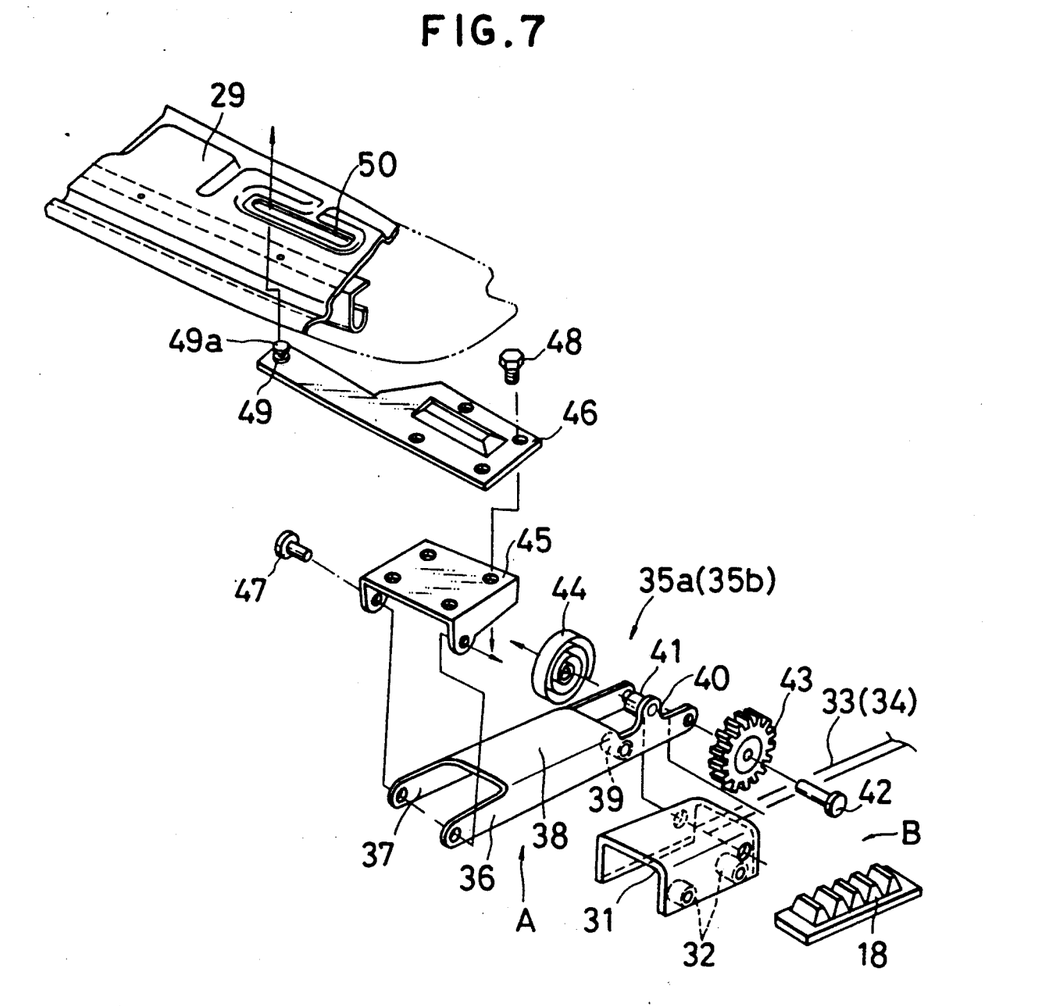
FIG. 7 is an exploded view showing the mounting of the front hard board to the link member.

As shown in FIGS. 6 and 7, each of the guide rails 11a and 11b supports displaceably a moving member 31 having a square C-shaped section. On the inner wall surface of the moving member 31 project a pair of guide pins 32 as a first sliding member, and the guide pi 32 is slidably fitted in the lower guide groove 14 of each of the guide rails 11a and 11b as shown in FIG. 6. A roller may be rotatably engaged with the guide pin 32 which may be moved along the guide groove 14. To the moving member 31 is connected a cable (wire) 33 or 34 drivable by a drive unit DU as will be described hereinabelow. The moving member 31 slide along the guide rail 11a or 11b by means of the cable 33 or 34 and a driving force applied by the drive unit DU.

Referring further to FIG. 6, each of link members 35a and 35b (first link members) constituting a guide means A is supported pivotably at its one end portion by each of the moving members 31, respectively. As specifically shown in FIG. 7, each of the link members 35a and 35b comprises a pair of link portions 36 and 37 disposed facing each other, and a connection portion 38 connecting the link portion 36 to the link portion 37. The link portion 36 is provided with a pin 39 as a second sliding member projecting from its inner side wall surface, and the pin 39 is located on the side closer to or toward one end portion of the link portion 36 from the connection portion 38. The link portion 36 is provided with a projection 40 projecting toward the transverse direction of the body at a position located between the one end portion thereof and the pin 39, and the projection 40 is supported at its inner side by a guide roller 41. The guide pin 39 may be engaged with a roller so as to allow a slidably movement of the link member. As shown in FIG. 6, each of the link member 35a and 35b is disposed such that it can take a recumbent posture as shown by the solid line in the drawing and an erect posture as shown by the broken line therein by means of a posture switching means B.

The posture switching means B will now be described in detail. The one end portion of the link portion 36 is supported by the moving member 31 through a support pin 42 in such a manner that the link portion 36 is mounted to the support pin 42 so as not to be relatively pivotable while the moving member 31 is also mounted to the support pin 42 so as to be relatively pivotable. To the support pin 42 is further mounted a pinion 43 in a relatively unpivotable manner, and the pinion 43 is located on the outward side of the link portion 36. A one end portion of the link portion 37 is supported by the moving member 31 through a support pin (not shown) in substantially the same manner as the link portion 36. To the support pin is fitted a spring 44 so as to urge each of the link members 35a and 35b in the direction of erecting against the moving member 31. Furthermore, the pin 39 of each of the link members 35a and 35b is engaged with the upper guide groove 13 of the respective guide rails 11a and 11b in such manner that the pin is displaceable on the side forward of the cut-away portion 16 of each of the guide rails 11a and 11b and the pinion 43 becomes meshable with the rack 18 when the pin 31 faces the cut-away portion 16 by moving the moving member 31. A further movement of the moving member 31 toward the rear of the vehicle body from the above posture allows a pivotal movement of the link member 35 in the direction of erecting by means of a meshed relationship of the pinion 43 with the rack 18 and an urging force of the spring 44. On the contrary, when the link member 35 is in an erect posture, a movement of the moving member 31 in the direction toward the front of the body allows the link member 35 to lie down and take a recumbent posture while resisting the urging force of the spring 44 by means of the relationship of the pinion 43 meshed with the rack 18, and the pin 39 is rested in the cut-away portion 16 of the guide groove 13.

Referring now to FIG. 7, each of the link members 35a and 35b is supported at its other end portion by the front hard board 29 through a mounting bracket 45 and a support plate 46. The mounting bracket 45 is held by the other end portion of each of the link members 35a and 35b, and the support plate 46 is fixed to the mounting bracket 45 by means of bolts 48. The support plate 46 is disposed to extend inward in the transverse direction of the vehicle body, and a pin 49 is projected upwardly at its one tip portion. In order to match with the pin 49, the front hard board 29 is provided with a sliding hole 50 extending in the transverse direction of the body as shown in FIG. 7. The sliding hole 50 is engaged with the pin 49, and this engagement permits a displacement of the front hard board 29 in the transverse direction of the body against the pin 49 of the support plate 46. The pin is provided at its tip with a head 49a in order to avoid a disconnection of the pin from the sliding hold 50.

Turning then to FIGS. 3 and 9, the board member 19 is connected to the vehicle body 51 through a pair of link members 52a and 52b. The link members 52a and 52b are longer in length than the respective link members 35a and 35b and extend along the respective guide rails 11a and 11b on the side rearward of the body from the rear header 7. Each of the link members 52a and 52b are pivotably supported at its one end portion, on the one hand, by the body 51 on the rearward end side of the respective guide rails 11a and 11b in such a manner that the direction of the center of the pivotal axis conincides substantially with the transverse direction of the body.

Figure 10:
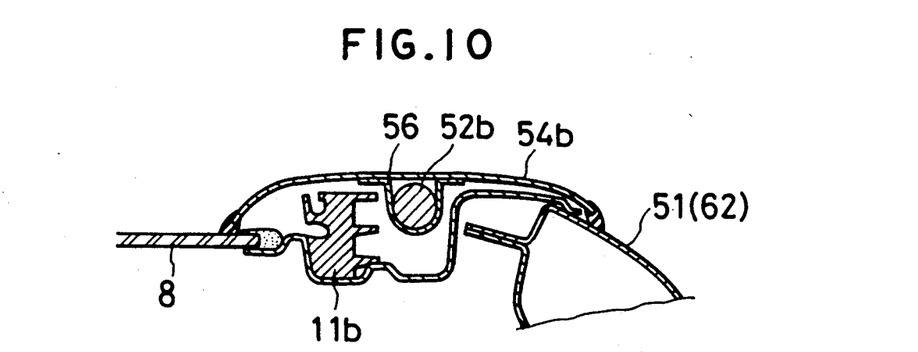
FIG. 10 is a section view taken along the line X10—X10 of FIG. 9.

As shown in FIGS. 9 and 10, on the other hand, each of the link members 52a and 52b is mounted with a garnish member 53 which comprises a pair of covering portions 54a and 54b in the form of a tough, and a connection portion 55 connecting the covering portions 54a and 54b to each other. The covering portion 54b is disposed to extend along the link member 52b and mounted to the link member 52a through a support jig 56 from the outside of the body. The covering portion 54b is in abutment with the vehicle body 51 to cover the link member 52b and the guide rail 11b, as shown in FIG. 10, when the link member 52b lies down on the side of the vehicle body 51, namely, when the board member 19 is located on the roof 2. Likewise, the covering portion 54a is mounted to the link member 52a through a support jig so as to cover the link member 52a and the guide rail 11a when the board member 19 is located on the roof 2. When the pair of the link members 52a and 52b is pivoted, the garnish member 54a and 54b are also pivoted in an integral manner.

Figure 12:
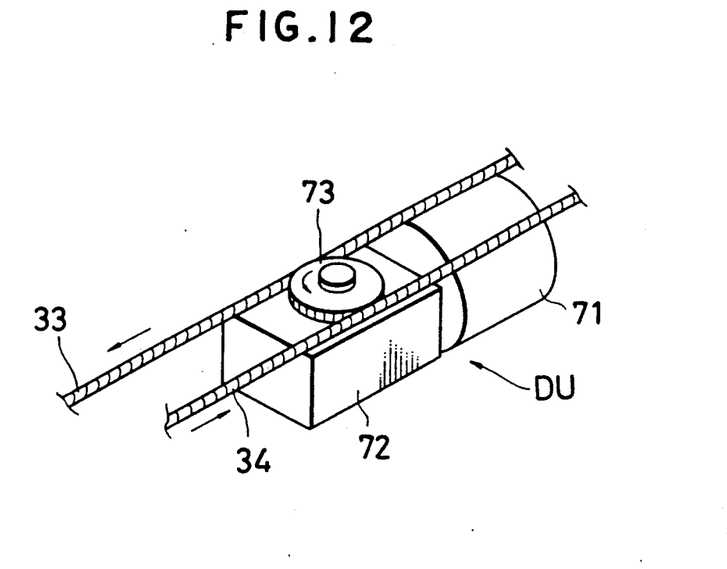
FIG. 12 is a perspective view showing the detail of a driving unit portion.

Turning back to FIG. 3, the drive unit DU is located at a position somewhat rearward of the lower end portion of the rear window glass panel 8 and at an approximately middle position in the transverse direction of the body. The drive unit DU comprises a motor 71, and a pinion 73 drivable by the motor 71 through a decelerator 72. Each of the cables (wires) 33 and 34 is provided at their outer circumferences with teeth or grooves so as to be meshable with the pinion 73 as shown in FIG. 12. The cable 33 is disposed such that its one end may be fixed, for example, to the left-hand moving member 31 and the other end portion is slidable along the right-hand guide rail 11a as a free end portion (FIG. 5). Likewise, the cable 34 is mounted at its one end to the right-hand moving member 31, and its other end portion is arranged so as to be slidable as a free end portion along the left-hand guide rail 11b.

The flexible top apparatus according to the present invention has been described with respect to its structure. An action of the structure thereof will now be described hereinbelow. A movement of the moving member 31 toward the rear of the vehicle body from the posture (first posture), as shown in FIGS. 1 and 3, by means of the cables 33 and 34 driven by the drive unit DU permits a movement of the link members 35a and 35b while being guided by the guide rails 11a and 11b, respectively, in the direction toward the rear of the body, followed by a rearward displacement of the front hard board 29. This movement gradually contracts the flexible top 4 and the both end portions of the skeletons 25 and 27 are engaged with the guide grooves 21a and 21b of the guide rails 20a and 20b on the guide member 19, respectively, while the skeletons 24, 26, and 28 are displaced upwardly over the guide rails 20a and 20b (second posture in FIG. 4). This permits a partial opening of the roof opening.

Figure 11:
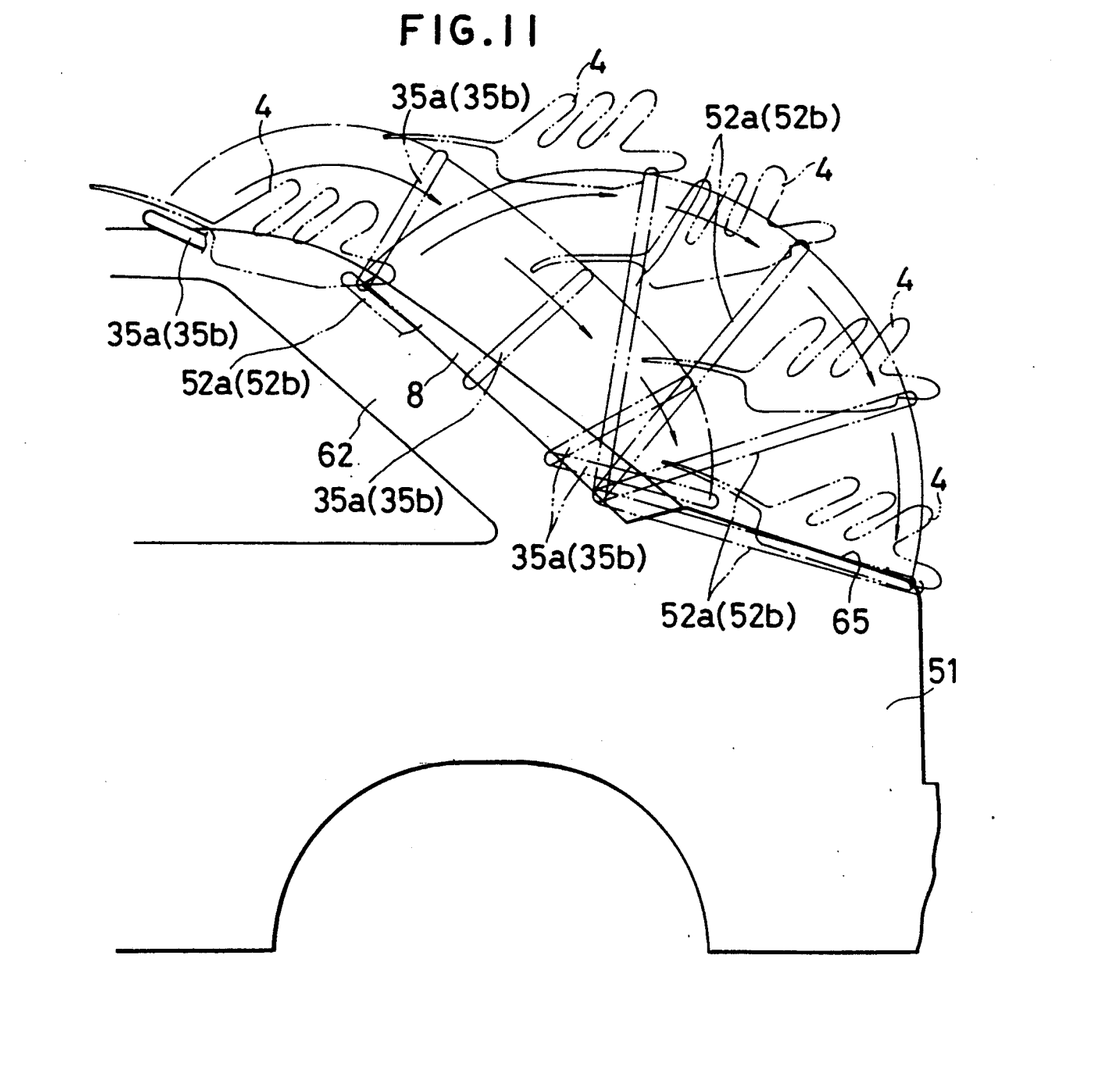
FIG. 11 is a view showing the loci of the flexible top and the board member from the roof position to the position below the lower end of the rear window glass panel.

A further rearward movement of the moving member 31 from this posture toward the rear of the body allows the pin 39 of the respective link members 35a and 35b to face the cut-away portion 16, as shown in FIG. 6, and the pinion 43 to mesh with the rack 18, thereby erecting the respective link members 35a and 35b in the manner as indicated by the imaginary line in FIG. 6 by means of the urging force of the spring 44 and the meshed engagement of the pinion 43 with the rack 18, thereby erecting the respective link members 35a and 35b in the manner as indicated by the imaginary line in FIG. 6 by means of the urging force f the spring 44 and the meshed engagement of the pinion 43 with the rack 18 attendant upon the movement of the moving member 31. This erect posture can be retained and maintained by means of an abutment of the guide roller 41 with the upper wall portion 15 of the respective guide rails 11a and 11b. This displacement of the link members 35a and 35b lifts up the flexible top 4 through the front hard board 29, as shown in FIG. 11, and the board member 19 is lifted up by the skeletons 25 and 27 of the flexible top 4 and, followed by the movement of the board member 19, the link members 35a and 35b are erected. As a result, the flexible top 4 is located at a position higher than the position of the rear header 7 on the side forward of the body from the rear header 7.

When the moving member 31 is further moved toward the rear of the body along the guide rails 11a and 11b from the above posture, the link members 35a and 35b are further moved downwardly below the rear window glass panel 8 along the guide rails 11a and 11b and the link members 35a and 35b are pivoted in a clockwise direction in FIG. 11 and then lies down. As a consequence, the flexible top 4 and the board members 19 are transferred at a position downward of the rear window glass panel 8 and eventually placed in a folded state on a trunk lid 65 (third posture). During the movement, as is shown schematically in FIG. 11, the flexible top 4 is retained and maintained at a spaced relationship away from the vehicle body 51 in an approximately horizontal state.

In the embodiments as have been described hereinabove, when the roof opening 3 is open, the flexible top 4 is placed at a position close to or in a vicinity of the lower end portion of the rear window glass panel 8 as shown in FIG. 2, not at a rear end portion of the roof opening 3, thereby enabling a full opening of the roof opening 3 and therefore providing a highly open feeling to the passengers.

The flexible top apparatus according to the present invention further enables the flexible top 4 to be placed on the side of the rear window glass panel 8, when the roof opening 3 is full open, in such a manner that the flexible top 4 does not protrude from the both sides of the body in the transverse direction so that it cannot be seen from the front of the vehicle body 51. This serves as reducing a running resistance to an extraordinary large extent.

Furthermore, in transferring the flexible top 4 toward the lower end portion of the rear window glass panel 8, the flexible top 4 is arranged so as to be away from the vehicle body 51 so that the flexible top 4 (sealing leather 23) can be prevented from rubbing the vehicle body. At the same time, the flexible top 4 can climb over or pass over the rear header 7 without difficulty so that it is not required to provide the rear header 7 toward the inside of the vehicle chamber in order to avoid an interference with the flexible top 4, whereby it is not required to lower a clearance for heads of passengers seated on the rear seats.

In accordance with the flexible top apparatus of the present invention, the link members 35a, 52a (35b, 52b) and the guide rail 11a (11b) enables a transferal of the flexible top 4 in such a state that it is held in an approximately horizontal manner as shown in FIG. 11, so that the flexible top 4 can be transferred while being retained in a shape that is substantially the same immediately before the transferal. Accordingly, when the flexible top 4 is returned to the position of the roof 2 in order to close the roof opening 3, operation of closing the roof opening 3 can immediately be carried out, thereby enabling the opening and closing of the roof opening 3 as a whole in a rapid and smooth manner.

As the link members 35a and 35b can be erected for sure on the side toward the front of the vehicle body from the rear header 7 by using the rack 18 and the pinion 43, the flexible top 4 can be located over the rear header 7 so that a smooth transferal of the flexible top 4 over the rear header 7 can be ensured without intervention from the rear header 7.

Furthermore, it is to be noted that, although the rear window glass panel 8 is usually so shaped that its width becomes broader outwardly in the transverse direction of the body as it goes downward, the guide rails 11a and 11b are disposed along the side end portions of the rear window glass panel 8 and the front hard board 29 is disposed displaceably in the transverse direction of the body with respect to the pin 47 on the support plate 46 so that the link members 35a and 35b are displaceable along the guide rails 11a and 11b between the second posture and the third posture and this arrangement permits the flexible top 4 to be transferred for sure between the position of the roof 2 (second position) and the position downward of the rear window glass pane 8 (third posture) along the guide rails 11a and 11b. As a consequence, an enlarged distance between the guide rails 11a and 11b at the lower position of the rear window glass panel 8 can be effectively utilized to thereby strengthen a supporting rigidity of the flexible top 4.

It is further noticeable that, as the flexible top 4 is transferred between the second posture and the third posture while being placed on the board member 19, the flexible top 4 can be treated without deformation during transfer, thereby enabling a smooth transferal of the flexible top 4 therebetween.

It is also to be noted that, when the board member 19 is located on the roof 2, namely, when the roof opening 3 is fully closed or partially open, the garnish member 53 is associated with the link members 52a and 52b so as to cover the guide rails 11a, 11b and the link members 52a, 52b, whereby an entanglement of a wind flow in the guide grooves 13 and 14 of the respective guide rails 11a and 11b can be prevented and a penetration of rain can be prevented. This serves as preventing a rust from occurring and as improving an outlook or appearance.

The present invention has been described by way of examples, however, it should be understood that it is not restricted to those embodied as have been described hereinabove and the following features should be considered as preferred embodiments according to the present invention.

The flexible top 4 may be driven manually as well as electrically driven.

The transfer of the flexible top 4 between the first posture (FIGS. 1 and 3) and the second posture (FIG. 4) and between the second posture and the third posture (FIG. 2) may be carried out by means of different drive units DU. In this case, the link members 35a, 35b and 52a, 52b may be connected to the board member 19. Furthermore, the drive unit DU for transferring the flexible top 4 between the first and second postures may be mounted on the board member 19.

The flexible top 4 may be of the type in which it is wound up. In this case, a winding roller may be mounted on the board member 19.

The present invention may be embodied in other specific forms without departing from the spirit and scope thereof. The present embodiments as have been described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A flexible top apparatus of a vehicle, comprising:
a roof panel connected to a vehicle body through at least a pair of left-hand and right-hand front pillars and a pair of left-hand and right-hand roof side rails,
a roof opening formed in said roof panel leaving a front header, a pair of left-hand and right-hand roof side rails, and a rear header, the roof opening being surrounded by said front header, said left-hand and right-hand roof side rails and said rear header;
a rear window glass panel fixed to said rear pillars and said rear header;
a flexible top having a size as substantially large as the roof opening in a state in which said flexible top is unfolded and expanded in a longitudinal direction of the vehicle body so as to assume an expanded state, wherein said flexible top is disposed to selectively take a first posture in which the roof opening is closed and a second posture in which said flexible top is contracted in a longitudinal direction of the body so as to assume a contracted state and located at a position in the vicinity of said rear header to open the roof opening; and
a guide means disposed between said flexible top and the vehicle body for guiding said flexible top in the contracted state between said second posture and a third posture which is located in the vicinity of a lower end position of said rear window glass panel at a spaced relationship away from said rear window glass panel, rear header, and rear pillars;
wherein said guide means comprises a first link member for supporting said flexible top and a second link member having a length longer than said first link member;
said first link member supports a forward end portion of said flexible top and a connection portion of said first link member to be connected to the vehicle body is slidable along said rear pillars and pivotable about an axis extending in a transverse direction of the body; and
said second link member supports a rearward end portion of said flexible top and a connection portion of said second link member to be connected to the body is pivotable about an axis extending in a transverse direction of the body at a position in the vicinity of said third posture.

2. A flexible top apparatus as claimed in claim 1, further comprising a board member on which said flexible top is placed at said second posture in a vicinity of said rear header;
wherein said flexible top is transferred together with said board member between said second posture and said third posture in accordance with a pivotal movement of said first link member and said second link member.

3. A flexible top apparatus as claimed in claim 2, wherein said flexible top comprises a front hard board in the form of a hard plate constituting a forward end portion of said flexible top, a rear hard board in the form of a hard plate constituting a rearward end portion of said flexible top, and a flexible sheet connecting said front hard board to said rear hard board and said flexible top is foldable in a longitudinal direction of the body; and
said rear hard board is located above a rearward end portion of said board member and selectively takes said first posture and said second posture by moving said front hard board in the longitudinal direction of the body.

4. A flexible top apparatus as claimed in claim 3, wherein:
a pair of left-hand and right-hand rearward guide rails are fixed on an upper surface of said board member for slidably guiding side end portions of said flexible top while regulating an upward displacement thereof; and
a pair of left-hand and right-hand forward guide rails is formed on the left-hand and right-hand side end Portions of said roof opening so as to be disposed to be separated from said rearward guide rails yet to become continuous to said rearward guide rails for slidably guiding left-hand and right- hand side end portions of said roof opening while regulating an upward displacement thereof.

5. A flexible top apparatus as claimed in claim 4, wherein:
said first link members are connected to said front hard board; and
said second link members are connected to a rearward end portion of said board member.

6. A flexible top apparatus as claimed in claim 2, further comprising:
guide rails extending along said left-hand and right-hand side end portions of said roof opening. respectively; and
said connection portion comprising a moving member disposed to be slidably movable along each of said guide rails;
wherein said first link member is mounted at one end portion to said moving member in such a manner as being pivotable about said axis extending in a transverse direction of the body and at its other end portion to said front hard board in such a manner as being pivotable about an axis extending in the transverse direction thereof; and
wherein said second link member is mounted to a rearward end portion of said board member in such a manner as being pivotable about an axis extending in the transverse direction thereof.

7. A flexible to apparatus as claimed in claim 6, wherein a posture switching means is provided which takes a recumbent posture in which said first link member lies down along said guide rail when said moving member is moved forward while acting upon said first link member at a position forward of said rear header and in a vicinity of the rearward end portion of said roof opening and which takes an erect posture in which said first link member is erected when said moving member is moved rearward.

8. A flexible top apparatus as claimed in claim 6, wherein said posture switching means comprises:
a pinion fixed to said first link member in such a manner that said first link member pivots about a pivotal axis on said moving member; and
a rack fixed to said roof panel at a position forward of said rear header and in the vicinity of the rearward end portion of said roof opening, said rack being meshable with said pinion.

9. A flexible top apparatus as claimed in claim 6, where:
- said guide rail is divided by a partition into an upper guide groove and a lower guide groove, each having an opening facing in the transverse direction of the body;
- said moving member is provided with a first sliding member so as to be slidably guided through said lower guide groove; and
- said first link member is provided with a second sliding member which is located at a position along said first link member at a position intermediate between said one end portion of said first link member with said moving member and said other end portion and which is slidably guided through said upper guide groove; and
- a cut-away portion is formed on an upper wall of said upper guide groove so as to allow said second sliding member to pass through the cut-away portion in accordance with a shift of the posture between a recumbent posture and an erect posture.

10. A flexible top apparatus as claimed in any one of claims 6 or 9, wherein said moving member is drivable by a motor through a cable.

11. A flexible top apparatus of a vehicle, comprising:
- a roof panel connected to a vehicle body through at least a pair of left-hand and right-hand front pillars and a pair of left-hand and right-hand rear pillars;
- a roof opening formed in said roof panel having a front header, a pair of left-hand and right-hand roof side rails, and a rear header and surrounded by said front header, said left-hand and right-hand roof side rails, an d said rear header;
- a rear window glass panel fixed to said rear pillars and said rear header; and
- a flexible top having a size as substantially large as the roof opening in a state in which said flexible top is unfolded and expanded in a longitudinal direction of the vehicle body so as to assume an expanded state, wherein said flexible top is disposed to selectively take a first posture in which the roof opening is closed and a second posture in which said flexible top is contracted in a longitudinal direction of the body so as to assume a contracted state and located at a position in the vicinity of said rear header to open the roof opening;
- wherein the flexible top is connected to the vehicle body through a guide means containing a link member disposed so as to be pivotable in a longitudinal direction of the vehicle body, and said flexible top in the contracted state is guided in accordance with a pivotal movement of the link member in a longitudinal direction thereof between said second posture and a third posture which is located in the vicinity of a lower end portion of said rear window glass panel at a spaced relationship away from said rear window glass panel, rear header, and rear pillars.

* * * * *